(12) United States Patent
Kobayashi

(10) Patent No.: US 6,839,168 B2
(45) Date of Patent: Jan. 4, 2005

(54) SCREEN

(75) Inventor: Makoto Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/462,593

(22) Filed: Jun. 17, 2003

(65) Prior Publication Data
US 2004/0021939 A1 Feb. 5, 2004

(30) Foreign Application Priority Data
Jun. 21, 2002 (JP) ........................................ 2002-180753

(51) Int. Cl.[7] .............................................. G03B 21/56
(52) U.S. Cl. ..................................................... 359/446
(58) Field of Search ................................ 359/443, 446; 353/69, 70; 248/923

(56) References Cited

U.S. PATENT DOCUMENTS

| 3,604,937 | A | * | 9/1971 | Hahn | .......................... 250/202 |
| 5,024,494 | A | * | 6/1991 | Williams et al. | ............... 353/42 |
| 5,080,481 | A | * | 1/1992 | Martin et al. | ................ 359/446 |
| 5,548,357 | A | * | 8/1996 | Appel et al. | ................... 353/69 |
| 6,416,186 | B1 | * | 7/2002 | Nakamura | .................... 353/69 |
| 6,507,435 | B1 | * | 1/2003 | Bergman | ..................... 359/443 |

* cited by examiner

Primary Examiner—Christopher E Mahoney
(74) Attorney, Agent, or Firm—Oliff & Berridge, PLC

(57) ABSTRACT

A screen having a projection surface on which a light beam irradiated by an optical equipment such as a projector is projected to form a projection image has luminous energy sensors (4U, 4D, 4L, 4R) and an attitude controller (70) for controlling the attitude of the projection surface based on the luminous energy detected by the luminous energy sensors (4U, 4D, 4L, 4R), in which, since the luminous energy sensors (4U, 4D, 4L, 4R) and the attitude controller (70) are provided, the attitude of the projection surface can be controllably adjusted by detecting the luminous energy of the projection image from the optical equipment, so that the projection surface of the screen can be correctly positioned relative to the optical equipment, thus automatically correcting trapezoidal distortion etc. of the projection image.

6 Claims, 7 Drawing Sheets

SCREEN

BACKGROUND OF THE INVENTION

1. Field of the Invention

The present invention relates to a screen having a projection surface on which a light beam irradiated by an optical equipment such as a projector is irradiated to form a projection image.

2. Description of Related Art

Conventionally, an optical equipment such as a projector which has an optical modulator for modulating a light beam irradiated by a light source in accordance with image information and projects the light beam modulated by the optical modulator in an enlarged manner has been widely used for presentation purpose etc.

The light beam irradiated by the optical equipment is projected on a projection surface of a screen to form a projection image in an enlarged manner, so that presentation before large number of audience can be efficiently conducted.

When the light beam irradiated by such optical equipment is projected on the projection surface of the screen, there may be trapezoidal distortion on the projection image formed on the projection surface if the optical equipment is not correctly positioned relative to the screen. For instance, when the projection surface is inclined in vertical direction relative to optical equipment such as a projector, originally rectangular projection image is trapezoidally distorted where the upper side or the lower side of the rectangle is lengthened. When the projection surface is inclined in horizontal direction relative to optical equipment, trapezoidal distortion where left or right side is lengthened is caused on the image.

Such distortion can be corrected by adjusting the position of the screen, however, so great size of screen is required for displaying large image that it is difficult to manually adjust the position of the screen and, if the position is to be manually adjusted, minute adjustment of the position of the projection surface is difficult.

Accordingly, a projector has been recently developed, where software for converting image signal inputted to optical modulator to correct trapezoidal distortion when the trapezoidal distortion is generated on the image is installed in a controller of the projector.

Such projector is capable of minutely modifying the profile of the optical image irradiated by the projector with the use of the trapezoidal-correction software of the projector to form appropriate rectangular projection image on the projection surface.

However, since such projection-side correction is conducted by forming a trapezoidal image without utilizing a part of rectangular image formation area of the optical modulator and projecting the trapezoidal image on the projection surface to form the rectangular projection image, the entire image formation area cannot be efficiently utilized.

Further, since such software has to be installed on an optical equipment such as a projector, the production cost of the projector is likely to be increased.

SUMMARY OF THE INVENTION

An object of the present invention is to provide a screen capable of automatically correcting a trapezoidal distortion generated on a projection image.

In order to attain an object of the present invention, a screen according to an aspect of the present invention includes: a projection surface on which a light beam irradiated by an optical equipment such as a projector is projected to form a projection image; a luminous energy sensor provided on the projection surface, the luminous energy sensor detecting a luminous energy of the light beam irradiated by the optical equipment; and an attitude controller that controls the attitude of the projection surface based on the luminous energy detected by the luminous energy sensor.

According to the above aspect of the present invention, since the luminous energy sensor and the attitude controller are provided, the attitude of the projection surface can be controlled by detecting the luminous energy of the projection image from the optical equipment, so that the projection surface of the screen can be correctly positioned relative to the optical equipment, thus automatically correcting trapezoidal distortion etc. of the projection image. Accordingly, there is no need for installing software for correcting trapezoidal distortion in the optical equipment such as a projector and increase in the production cost of the optical equipment can be prevented.

In the above, the screen may preferably include a first drive mechanism that turns the projection surface around a first axis extending along a horizontal direction of the projection surface; and a second drive mechanism that turns the projection surface around a second axis extending in a vertical direction of the projection surface, in which the attitude controller may preferably control the first drive mechanism and the second drive mechanism.

The drive mechanisms may preferably have a stepping motor as a drive source.

According to the above arrangement, since the attitude of the projection surface can be controllably changed in any directions only by two simple drive mechanisms, the structure of the screen can be simplified.

The luminous energy sensor may preferably include four photoelectric transducers including a first pair of photoelectric transducers and a second pair of photoelectric transducers, the first pair of photoelectric transducers being provided along the vertical direction of the projection surface and the second pair of photoelectric transducers being provided along the horizontal direction of the projection surface.

Various photoelectric transducers may be used, which may be a photodiode, a phototransistor, a CCD image pickup device etc.

According to the above arrangement, the first pair of photoelectric transducers can be used for detecting luminous energy when the projection surface is rotated around a horizontal axis thereof and the second pair of photoelectric transducer can be used for detecting luminous energy when the projection surface is rotated around a vertical axis thereof, thus simplifying the process of attitude adjustment.

In the above, the photoelectric transducer may preferably be a photodiode.

Since the photodiode is inexpensive as a photoelectric transducer and is widely used, the production cost of the screen according to the present invention is not so increased.

In the above, the luminous energy sensor may preferably have a bridge circuit that uses the four photoelectric transducers as resistor elements.

Since the bridge circuit is provided, the luminous energy detected by the four photoelectric transducers can be judged equal when the output of the bridge circuit becomes zero, thus constructing the luminous energy sensor with an extremely simple construction.

DETAILED DESCRIPTION OF PREFERRED EMBODIMENT(S)

An embodiment of the present invention will be described below with reference to attached drawings.

[First Embodiment]

Figure 1:
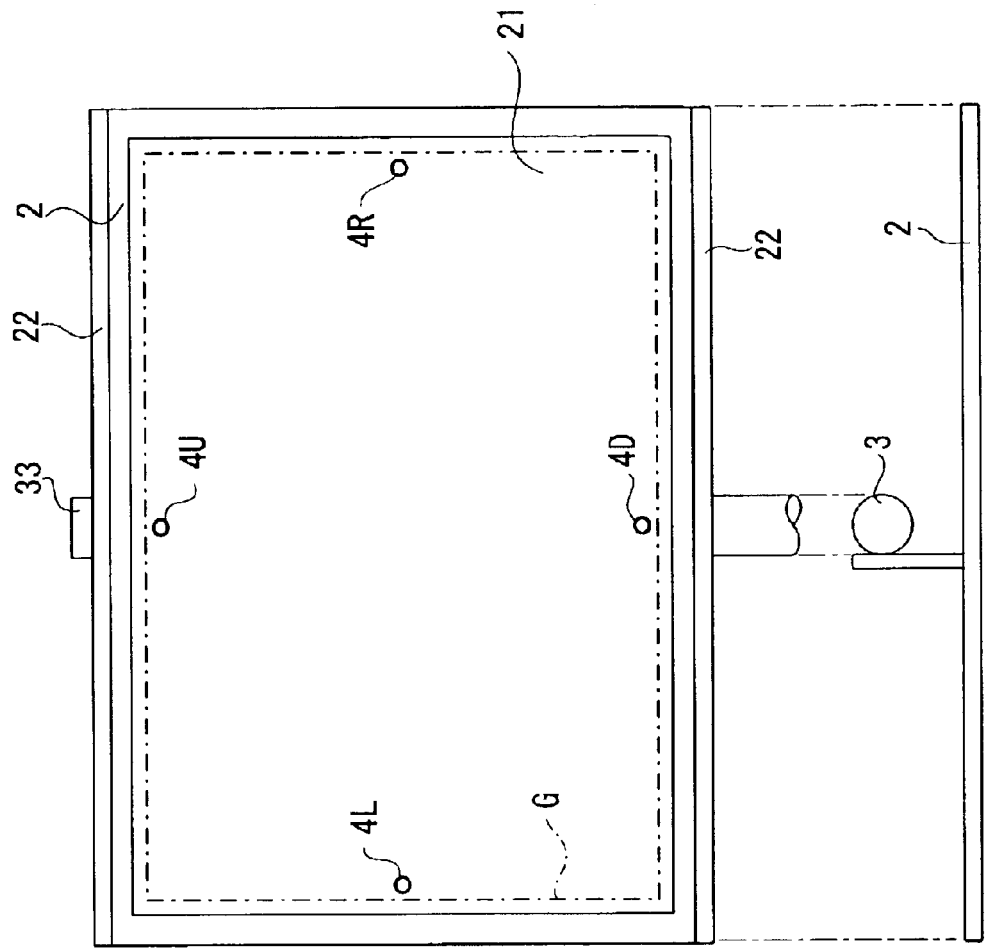
FIG. 1 is a front elevational view, plan view and side elevational view showing a structure of a screen according to an embodiment of the present invention.
Figure 1:
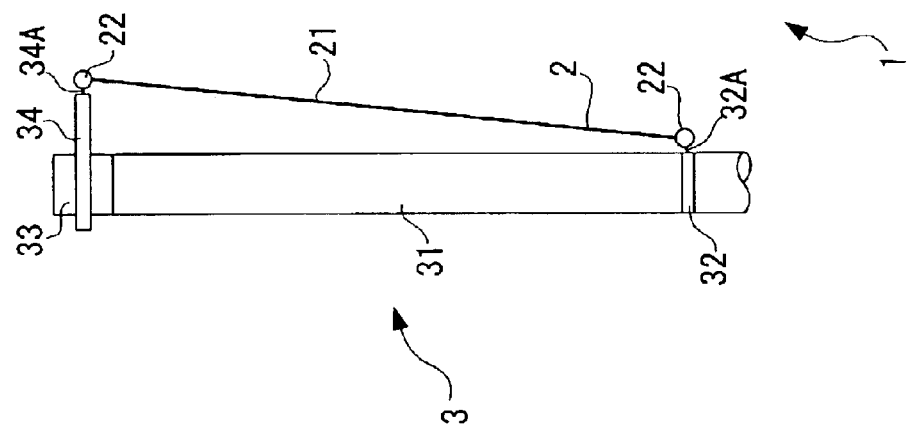

FIG. 1 shows a screen 1 according to an embodiment of the present invention.

The screen 1 has a screen body 2 and a column 3.

The screen body 2 as a projection surface has a white rectangular image formation surface 21 and a frame 22 provided along the upper and lower sides of the image formation surface 22.

The image formation surface 21 has a multiple minute glass beads buried on white paint surface. The frame 22 prevents the image formation area 21 from being bent while projecting an optical image from an optical equipment such as a projector.

Four luminous energy sensors 4U, 4D, 4L and 4R are provided around the periphery of the image formation surface 21 of the screen body 2.

In the luminous energy sensors 4U, 4D, 4L and 4R, the luminous energy sensors 4U and 4D are vertically disposed on the image formation surface 21 and the luminous energy sensors 4L and 4R are horizontally disposed on the image formation surface 21. The respective luminous energy sensors 4U, 4D, 4L and 4R are located at the center of the respective sides of the rectangular image formation surface 21 and inside an image G projected by the optical equipment such as a projector etc.

The column 3 is for setting up the screen body 2 without other support, which is connected with the screen body 2 approximately at the center of the screen body 2, and is provided with non-illustrated leg at the bottom end thereof.

The column 3 has a column body 31, revolving portions 32 and 33, and an arm 34. The column body 31 is constructed by a metal cylindrical tube, which has an undercutting for attaching the revolving portion 32 on a surface at the intermediate portion thereof.

The revolving portion 32 is constructed as a ring-shaped component engaged with the undercutting formed on the intermediate portion of the column body 31, which is rotatable around the cylinder center of the column body 31. The revolving portion 32 is connected with the frame 22 of the screen body 2 through a connector 32A, the connector 32A being turnable in vertical direction relative to the revolving portion 32.

The revolving portion 33 is constructed as a cylindrical member engaging with the upper end of the column body 31, which is rotatable relative to the column body 31 in the same manner as the revolving portion 32. Though not shown in FIG. 1, an inner gear meshing with a below-described around-vertical-axis drive mechanism 50 is provided on an inner circumference of the cylindrical revolving portion 33.

The arm 34 is a stick-shaped component slidably attached to the outer circumference of the revolving portion 33. Though not shown in FIG. 1, a rack meshing with a below-described around-horizontal-axis drive mechanism 60 is provided on the lower side of the arm 34.

A connector 34A is provided on the distal portion of the arm 34 in slide direction in a rotatable manner in vertical direction relative to the arm 34. An upper central portion of the frame 22 engages with the connector 34A.

Figure 2:
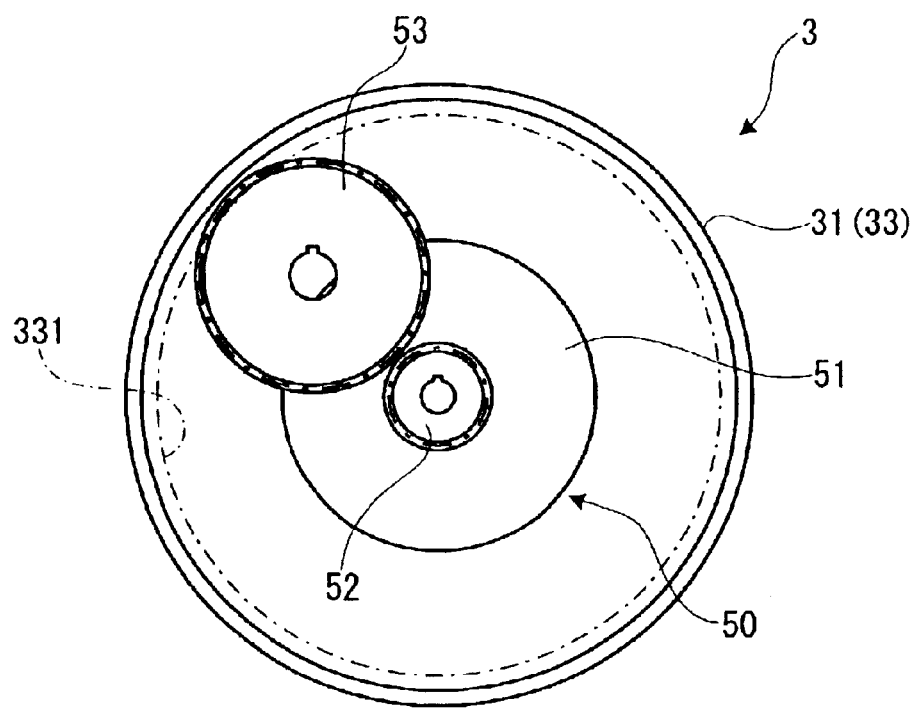
FIG. 2 is a schematic illustration showing a structure of around-vertical-axis drive mechanism of the aforesaid embodiment.
Figure 3:
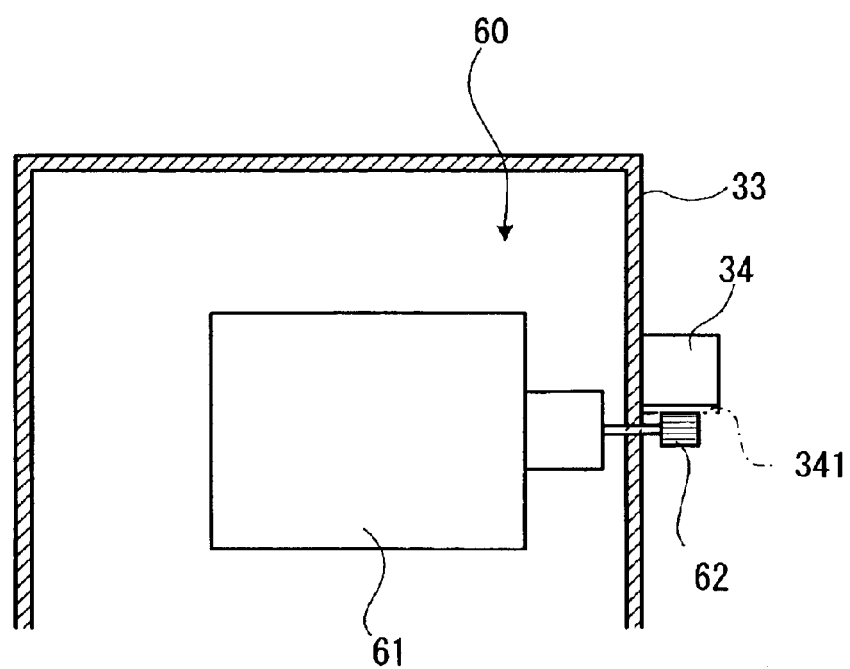
FIG. 3 is a schematic illustration showing a structure of around-horizontal-axis drive mechanism of the aforesaid embodiment.

As shown in FIGS. 2 and 3, the around-vertical-axis drive mechanism 50 and the around-horizontal-axis drive mechanism 60 are provided inside the cylindrical column 3.

As shown in FIG. 2, the around-vertical-axis drive mechanism 50 has a stepping motor 51, a first gear 52 and a second gear 53.

The stepping motor 51 is fixed inside the column body 31 and is driven by an electric pulse signal inputted thereto, which is rotated rightward or leftward in accordance with polarity of the electric pulse signal.

The first gear 52 is attached to the rotary shaft of the stepping motor 51 and is rotated together with the rotary shaft.

The second gear 53 meshes with the first gear 52 while meshing with an inner gear 331 provided inside the revolving portion 33 to transfer the rotation of the first gear 52 to the revolving portion 33.

In the around-vertical-axis drive mechanism 50, when an electric pulse signal of predetermined steps is inputted to the stepping motor 51, the rotary shaft of the stepping motor 51 is driven to rotate the revolving portion 33 through the first gear 52 and the second gear 53.

When the revolving portion 33 is rotated, the screen body 2 shown in FIG. 1 turns around the vertical axis to adjust the attitude thereof around the vertical axis relative to the optical equipment such as a projector.

As shown in FIG. 3, the around-horizontal-drive mechanism 60 has a stepping motor 61 provided inside the revolving portion 33 and a gear 62 provided on the distal end of the rotary shaft of the stepping motor 61, the gear 62 being provided outside the revolving portion 33 and meshing with a rack 341 provided on the lower side of the arm 34.

When the stepping motor 61 is rotated, the gear 62 is rotated and the arm 34 is slid in a normal direction of FIG. 3 by the rack 341 meshing with the gear 62.

When the arm 34 is slid, the upper side of the screen body 2 shown in FIG. 1 advances or retracts in the normal direction of the screen surface. In other words, the upper side of the screen body 2 turns around the lower side thereof, i.e. the frame 22 on the lower side to adjust the attitude of the screen body 2 around the horizontal axis relative to the optical equipment such as a projector.

Figure 4:
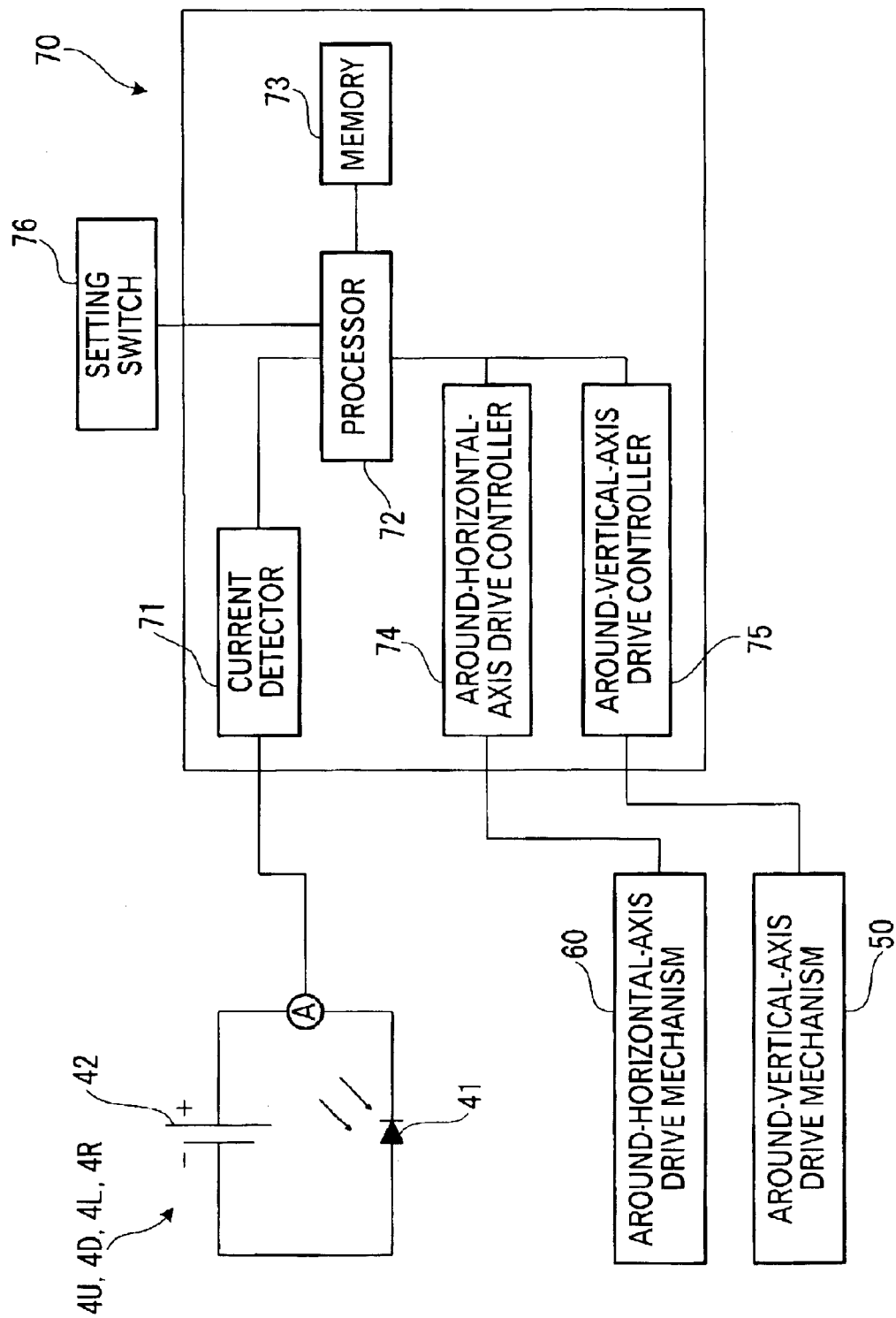
FIG. 4 is a block diagram showing an arrangement of attitude controller of the aforesaid embodiment.

Such drive mechanisms 50 and 60 are controlled by a controller 70 provided inside the column body 31 as shown in FIG. 4.

The controller 70 as an attitude controller is an ASIC (Application Specific Integrated Circuit), which includes a current sensor 71, a processor 72, a memory 73, an around-vertical-axis drive controller 74 and an around-horizontal-axis drive controller 75.

The current sensor 71 detects the electric signal from the above-described luminous energy sensors 4U, 4D, 4L and 4R.

More specifically, the luminous energy sensors 4U, 4D, 4L and 4R are closed circuits including a photodiode as a photoelectric transducer and a power source 42.

The power source 42 inversely applies bias voltage to the photodiode 41. When the bias voltage is applied, electric current does not flow in the closed circuit being blocked at PN-junction of the photodiode 41.

However, when light is irradiated on the photodiode, positive hole and electron are separated on the PN-junction of the photodiode 41 to move respectively to the anode and cathode sides so that the electric current flows through the closed circuit.

The current sensor 71 detects the electric current flowing through the luminous energy sensors 4U, 4D, 4L and 4R and converts the electric current value into a digital signal to output to the processor 72. Incidentally, the respective luminous energy sensors 4U, 4D, 4L and 4R are arranged in parallel relative to the current sensor 71 so that the current sensor 71 outputs the current value of the respective luminous energy sensors 4U, 4D, 4L and 4R to the processor 72.

The processor 72 determines the attitude of the screen body 2 relative to the optical equipment based on the detected current value, which judges the attitude of the screen body 2 by comparing the current values of the four luminous energy sensors 4U, 4D, 4L and 4R.

The processor 72 also conducts correction calculation in accordance with image characteristics of the optical equipment.

For instance, when an optical image is formed on the screen body 2 by an up-shifting projector, the brightest projection image area is at the lower center of the image formation surface and the other area is darker, the processor 72 corrects the current values of the luminous energy sensors 4U, 4D, 4L and 4R before comparing the current values.

The correction data is stored in the memory 73. When up-shift projection is selected by a connected setting switch 76, the processor 72 fetches the correction data from the memory 73 to compare the current value.

The around-horizontal-axis drive controller 74 and the around-vertical-axis drive controller 75 generate a control signal for the around-horizontal-axis drive mechanism 60 and the around-vertical-axis drive mechanism 50 based on the judgment by the processor 72.

The control signal around the horizontal axis is generated based on the comparison of the current values of the luminous energy sensors 4U and 4D.

Specifically, when the processor 72 judges that the current value of the luminous energy sensor 4D is smaller than the current value of the luminous energy sensor 4U, it is determined that the upper side of the screen body 2 is too close to the optical equipment, so that the around-horizontal-axis drive controller 74 generates a control pulse signal for moving the arm 34 toward the column body 31 and outputs the signal to the around-horizontal-axis drive mechanism 60.

Figure 5:
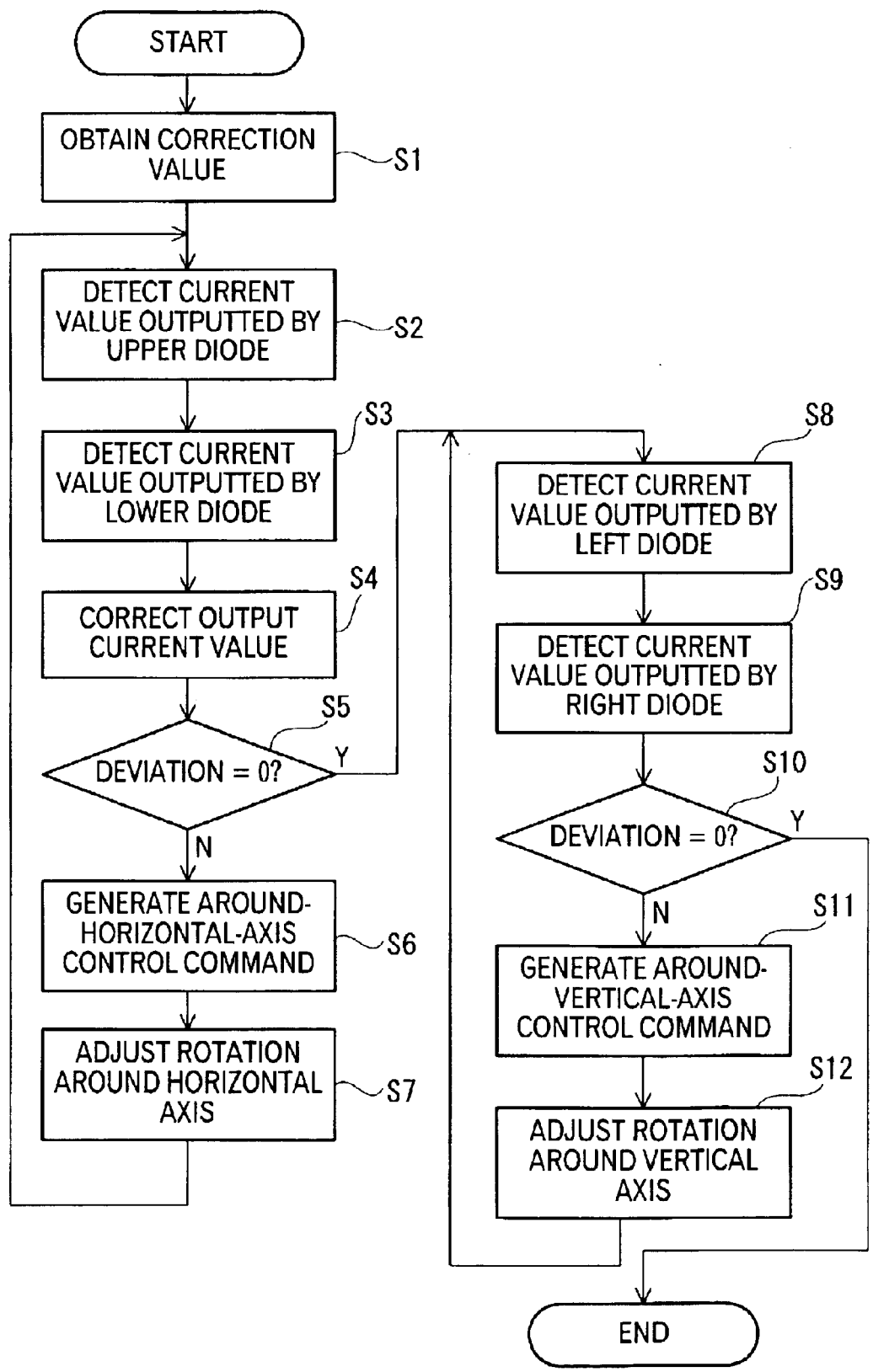
FIG. 5 is a flow chart showing an operation of the screen in the aforesaid embodiment.

Next, the operation of the screen 1 will be described below with reference to a flowchart shown in FIG. 5.

Figure 6:
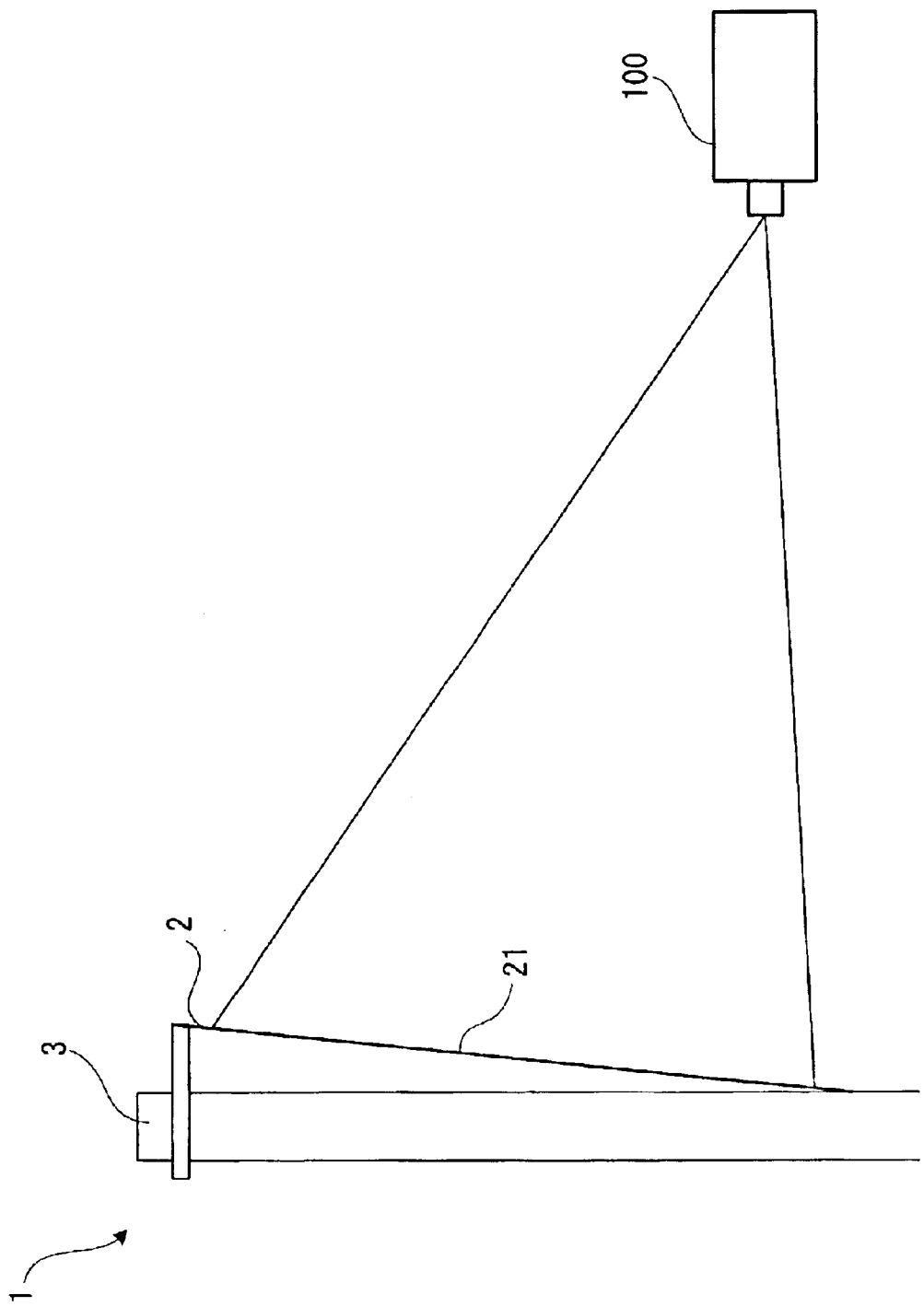
FIG. 6 is a schematic illustration showing the screen of which attitude has been adjusted.

(1) Initially, as shown in FIG. 6, when the power of the drive mechanisms 50 and 60 and the controller 70 of the screen 1 are turned on while the projection image of a projector 100 is formed on the image formation surface 21 of the screen body 2, the processor 72 checks the condition of the setting switch 76 and fetches the correction value in accordance with the setting from the memory 73 (step S1).

(2) The current sensor 71 detects the electric current flowing through the closed circuit of the luminous energy sensor 4U including the photodiode 41 and converts the electric current into a digital signal to output to the processor 72 (step S2). Subsequently, the current sensor 71 detects the electric current flowing through the closed circuit of the luminous energy sensor 4D including the photodiode 41 and converts the electric current into a digital signal to output to the processor 72 (step S3).

(3) The processor 72 corrects the output current values of the luminous energy sensors 4U and 4D (step S4) and compares the both output current values (step S5). The output current value is corrected by multiplying the respective current values by a predetermined coefficient in accordance with the design illuminance on the upper projection area and the design illuminance on the lower projection area of the projector 100.

(4) When the deviation between the corrected output current value of the luminous energy sensor 4U and output current value of the luminous energy sensor 4D is not zero, the processor 72 outputs the deviation to the around-horizontal-axis drive controller 74.

(5) The around-horizontal-axis drive controller 74 generates a control pulse signal consisting of rotary direction and step number based on the obtained deviation, which is outputted to the around-horizontal-axis drive mechanism 60 (step S6). The around-horizontal-axis drive mechanism 60 advances and retracts the arm 34 relative to the column body 31 based on the control pulse signal (step S7). The processor 72 and the around-horizontal-axis drive controller 74 repeat comparing the output current values and generating the control pulse signal until the deviation of the output current values becomes zero to adjust vertical inclination of the screen body 2.

(6) When the vertical attitude adjustment of the screen body 2 is completed, the current sensor 71 detects the output current value of the left luminous energy sensor 4L (step S8) with the output current value of the right luminous energy sensor 4R (step S9), which are respectively converted into digital signals to be outputted to the processor 72.

(7) The processor 72 compares the respective output current values (step S10). At this time, in the present embodiment, the processor 72 does not correct the output current value as in vertical adjustment but directly compares both output current values to calculate deviation therebetween. This is because it is unlikely that there is deviation between the right and left design illuminance in an optical equipment such as a projector 100.

(8) When a deviation is detected between the output current values after comparing the output current value, the around-vertical-axis drive controller 75 generates a control pulse signal in accordance with the deviation (step S11) to output to the around-vertical-axis drive mechanism 50. The around-vertical-axis drive mechanism 50 rotates the revolving portion 33 based on the control pulse signal (step S12) and terminates the operation and keeps the position when the deviation between the luminous energy sensors 4L and 4R becomes zero.

According to the above embodiment, following advantages can be obtained.

Since the screen 1 has the luminous energy sensors 4U, 4D, 4L and 4R, the around-horizontal-axis drive controller 74, the around-vertical-axis drive controller 75, the around-vertical-axis drive mechanism 50 and the around-horizontal-axis drive mechanism 60, the attitude of the image formation surface 21 can be controlled by detecting the luminous energy of the projection image from the projector 100, so that the image formation surface 21 of the screen 1 can be correctly positioned to the projector 100 and the trapezoidal distortion etc. of the projection image can be automatically corrected. Accordingly, it is not necessary to install software for correcting trapezoidal distortion to the projector 100 and the production cost of the optical equipment is not unnecessarily increased.

Since the attitude controller includes the around-vertical-axis drive mechanism 50 and the around-horizontal-axis drive mechanism 60, the attitude of the image formation surface 21 of the screen body 2 can be changed in any direction only by the two rotary mechanisms, thus simplifying the structure of the screen 1.

Since the luminous energy sensors 4U and 4D are arranged along vertical direction and the luminous energy sensors 4R and 4L are arranged along horizontal direction, the attitude adjustment of the image formation surface 21 by the around-horizontal-axis drive mechanism 60 and the attitude adjustment of the image formation surface 21 by the around-vertical-axis drive mechanism 50 can be separately conducted, thus facilitating attitude adjustment process.

Since the luminous energy sensors 4U, 4D, 4L and 4R include the photodiode 41, the arrangement for detecting luminous energy can be inexpensively provided on the screen 1, thus avoiding increase in the production cost of the screen 1.

Since the processor 72 corrects the output current value detected by the current sensor 71 in accordance with the type of the projector 100, the attitude of the image formation surface 21 of the screen body 2 can be appropriately adjusted even in an up-shifting projector 100.

[Second Embodiment]

Next, second embodiment of the present invention will be described below. Incidentally, the same reference numeral will be attached to the components identical with the components which have been described above to omit or simplify the description thereof.

In the above first embodiment, the luminous energy sensors 4U, 4D, 4L and 4R are connected in parallel relative to the current sensor 71.

Figure 7:
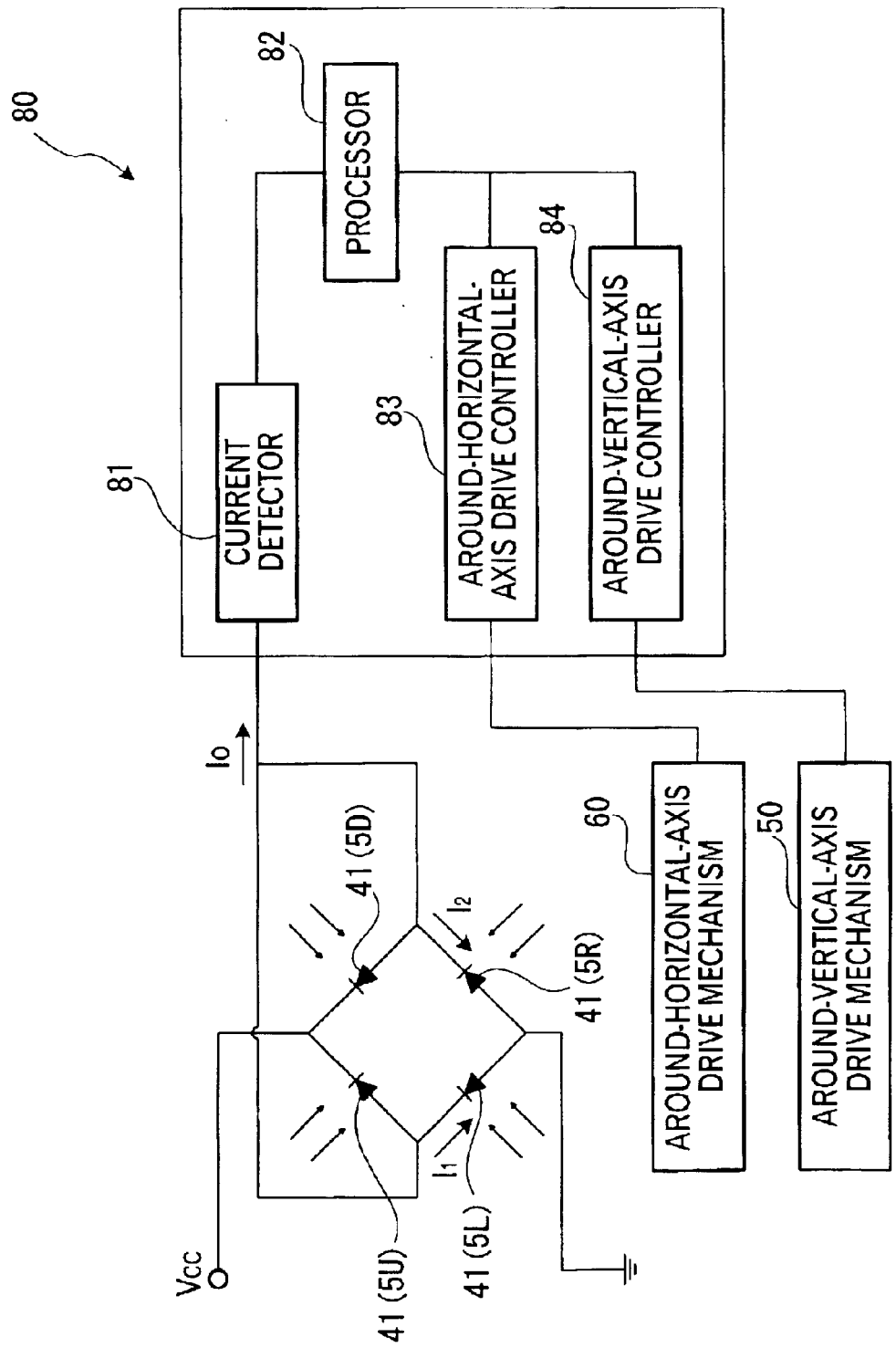
FIG. 7 is a block diagram showing a structure of a screen according to second embodiment of the present invention.

In contrast, luminous energy sensors 5U, 5D, 5L and 5R according to second embodiment are constructed as a bridge circuit where the photodiodes 41 of the respective sensors are arranged as resistor elements. Incidentally, the luminous energy sensors 5U, 5D, 5L and 5R are arranged on the screen in a manner similar to the first embodiment, in which the luminous energy sensor 5U is located on the upper side of the screen, the luminous energy sensor 5D is located on the lower side of the screen, the luminous energy sensor 5L is located on the left side of the screen and the luminous energy sensor 5R is located on the right side of the screen as shown in FIG. 7.

In the bridge circuit, the photodiode 41 of the luminous energy sensors 5U, 5D, 5L and 5R is arranged so that voltage Vcc is inversely applied to the bridge circuit. The luminous energy sensors 5U and 5D are connected in parallel while being branched at the voltage applying portion, and the luminous energy sensors 5L and 5R are connected in parallel at the downstream side of the luminous energy sensors 5U and 5D.

In such bridge circuit, when output current Io becomes zero and $I_1$ is equal to $I_2$, the projection surface of the screen can be correctly positioned relative to the optical equipment and balanced condition represented by following equation (1) is established, where the resistances of the respective photodiodes 41 are Ru (the luminous energy sensor 5U), RD (the luminous energy sensor 5D), Rl (the luminous energy sensor 5L), Rr (the luminous energy sensor 5R), the current that flows to the luminous energy sensor 5L is $I_1$ and the current that flows to the luminous energy sensor 5R is $I_2$.

$$Ru*Rr=Rd*Rl \tag{1}$$

Incidentally, the current sensor 81 detects $I_1$ and $I_2$ though not shown in FIG. 7.

In the above-arranged screen, while a processor 82 of a controller 80 monitors the output current Io, current $I_1$ and current $I_2$ detected by a current sensor 81, the around-horizontal-axis drive mechanism 60 and the around-vertical-axis drive mechanism 50 are controllably driven by an around-horizontal-axis drive controller 83 and an around-vertical-axis drive controller 84.

When the output current Io detected by the current sensor 81 becomes zero and $I_1$ is equal to $I_2$, the processor 82 determines that the balanced condition shown by the equation (1) is established and the luminous energy detected by the respective photodiodes 41 is equal, and terminates drive control by the around-horizontal-axis drive controller 83 and the around-vertical-axis drive controller 84.

According to the second embodiment, following advantages as well as the advantage described in the first embodiment can be obtained.

Since the processor 82 determines that the luminous energy detected by the respective luminous energy sensors 5U, 5D, 5L and 5R are equal based on the balanced condition of the bridge circuit, it is only necessary to detect three currents, i.e. output current Io, current $I_1$ and current $I_2$ from the bridge circuit by the current sensor 81 for judgment, thus simplifying the construction of the luminous energy sensor.

[Modifications]

Incidentally, the scope of the present invention is not restricted to the above-described embodiments, but includes following modifications.

Though the bridge circuit of the second embodiment is constructed by arranging the four photodiodes 41 of the four luminous energy sensors 5U, 5D, 5L and 5R as resistor elements, such arrangement is not limiting.

Figure 8:
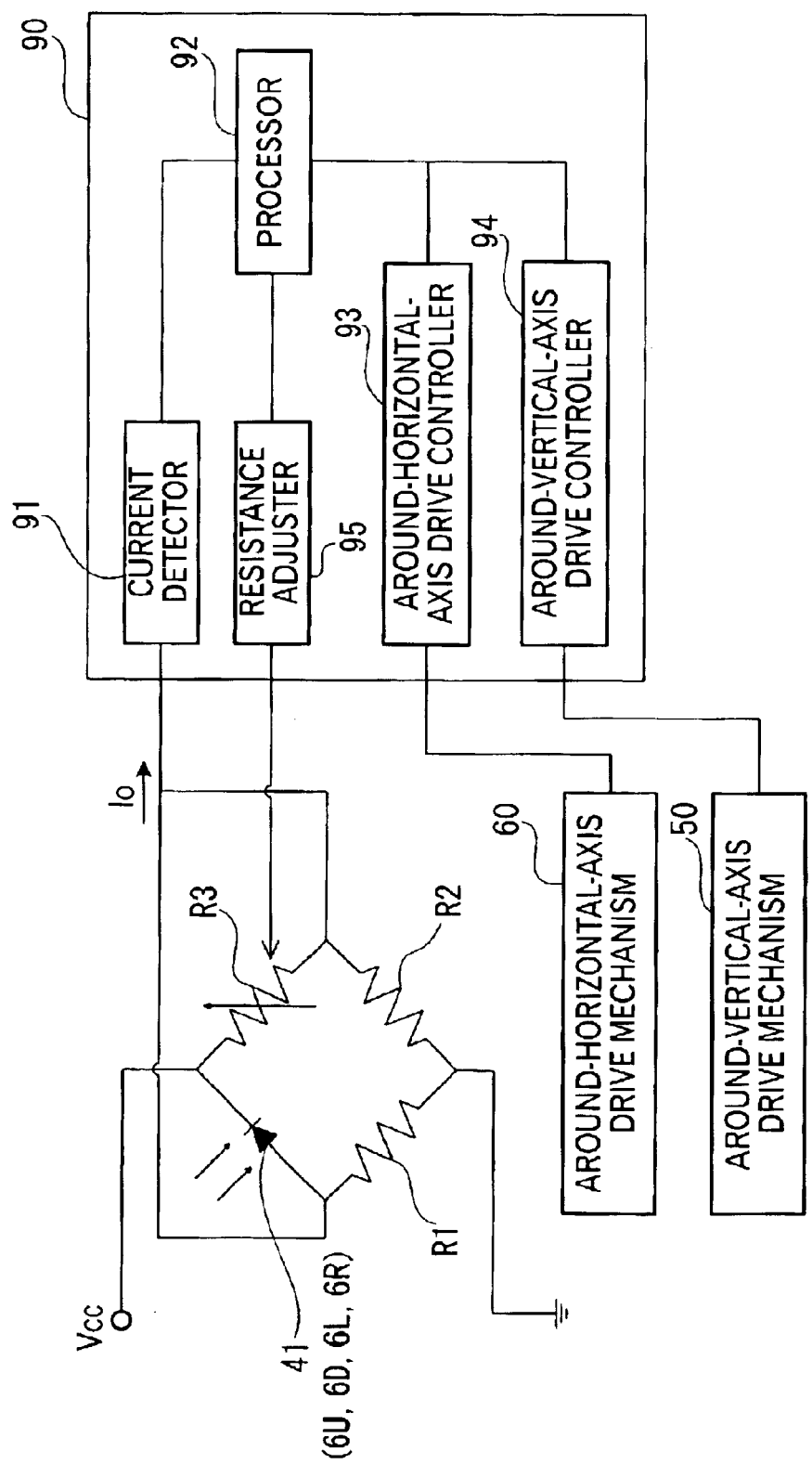
FIG. 8 is a block diagram showing a structure of a screen according to a modification of the embodiment of the present invention.

For instance, as shown in FIG. 8, a bridge circuit may be constructed by photodiodes 41 of luminous sensors 6U, 6D, 6L and 6R, known fixed resistors R1 and R2 and a variable resistor R3, where the resistance value of the photodiode 41 having received a predetermined luminous energy may be calculated by the adjustment value of the variable resistor R3.

In this case, a resistance adjuster 95 may be provided on a controller 90 as well as a current sensor 91, a processor 92, an around-horizontal-axis drive controller 93 and an around-vertical-axis drive controller 94, where the resistance value of the photodiode 41 can be obtained by adjusting the variable resistor 63 by the resistance adjuster 95 so that the output current Io detected by the current sensor 91 becomes zero.

Though the photodiode 41 is used as a photoelectric transducer of the luminous energy sensors 4U, 4D, 4L and 4R in the first embodiment, such arrangement is not limiting but a photoelectric transducer such as a phototransistor may be used.

Though the present invention is applied to a front-projection type screen in the above embodiment, the present invention may be used in a rear-projection type screen where the optical image is displayed from the opposite side for the audience to see the screen.

Specific structure and shape of the components in the present invention may be designed in any manner as long as an object of the present invention can be achieved.

What is claimed is:

1. A screen, comprising:

a projection surface on which a light beam irradiated by an optical equipment is projected to form a projection image;

a luminous energy sensor provided on the projection surface, the luminous energy sensor detecting a luminous energy of the light beam irradiated by the optical equipment; and an attitude controller that controls the attitude of the projection surface facing the optical equipment based on the luminous energy detected by the luminous energy sensor.

2. The screen according to claim 1, further comprising:

a first drive mechanism that turns the projection surface around a first axis extending along a horizontal direction of the projection surface; and a second drive mechanism that turns the projection surface around a second axis extending in a vertical direction of the projection surface, the attitude controller controlling the first drive mechanism and the second drive mechanism.

3. The screen according to claim 2, the luminous energy sensor including four photoelectric transducers including a first pair of photoelectric transducers and a second pair of photoelectric transducers, the first pair of photoelectric transducers being provided along the vertical direction of the projection surface and the second pair of photoelectric transducers being provided along the horizontal direction of the projection surface.

4. The screen according to claim 3, photoelectric transducer being a photodiode.

5. The screen according to claim 4, the luminous energy sensor having a bridge circuit that uses the four photoelectric transducers as resistor elements.

6. The screen according to claim 3, the luminous energy sensor having a bridge circuit that uses the four photoelectric transducers as resistor elements.

* * * * *